April 14, 1936.  E. SEIGNOL  2,037,345
MILEAGE COUNTER FOR THE HUBS OF VEHICLE WHEELS
Filed Sept. 12, 1932
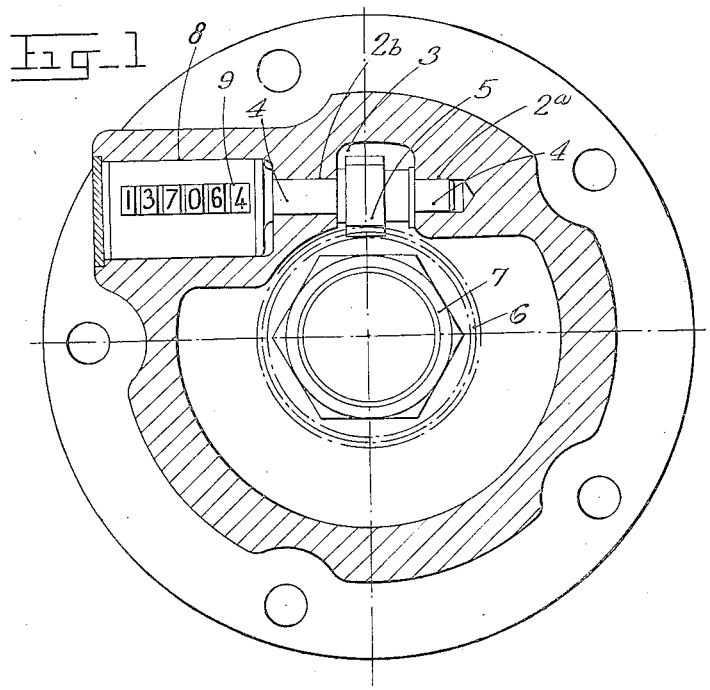
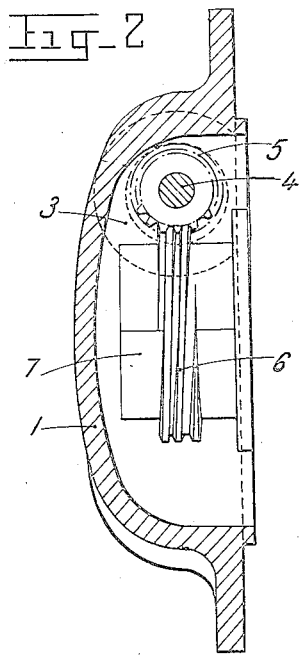
Edouard Seignol,
Inventor.
A. M. Bunn,
Attorney.

Patented Apr. 14, 1936

2,037,345

UNITED STATES PATENT OFFICE 2,037,345

MILEAGE COUNTER FOR THE HUBS OF VEHICLE WHEELS

Edouard Seignol, Neuilly-sur-Seine, France

Application September 12, 1932, Serial No. 632,843
In France April 19, 1932

3 Claims. (Cl. 235—95)

The present invention relates to mileage counters located upon the hubs of vehicle wheels, and it has for its object a new and practical arrangement for the driving of such counters.

The idea of locating a counter upon the hub of a motor vehicle has been favored by numerous constructions, as this arrangement eliminates a good part of the risks attending the counters controlled by a flexible drive, since this latter is subject to breakage, or may be removed against the will of the owner of the vehicle, or like disadvantages may occur.

Various devices of this class have been constructed in which the counter mechanism is mounted on the wheel cap itself, or within the said cap, forming part of the same, and thus it is protected against all damage, and it becomes difficult or even impossible to remove in an illicit manner.

However, it is a fact that counters of this class have been practically abandoned, and this, in spite of the qualities which are solely possessed by this type, is entirely due to defects in the method of construction and control.

As a general rule, the hub counters hitherto in use possess the following general characteristics. The counter mechanism as well as the counter itself have been situated in line with the end of the journal, and thus extend outwardly of this end, and the main shaft of the counter is usually operated by a stud or arm, mounted as a rule upon the nut of the journal, which stud may be screwed into the nut or may consist of the pin of the nut which is bent at right-angles, and the function of this stud or arm which is secured to the nut or journal and is thus in the fixed position, is to hold the main shaft of the mileage counter against motion.

The mileage counter, the subject-matter of the invention, has none of the defects inherent in the known devices. It has a very substantial construction and does not extend beyond the limits of the normal wheel cap, and is protected against all entrance of grease into the counter mechanism.

The counter which is mounted upon motor vehicle consists of a mechanism in which the figures on the several drums or discs indicate kilometers or hectometers, or in other cases, tens, hundreds, (etc.) of revolutions of the wheel, and thus the device is in all cases a mechanism adapted to transfer the rotation of a shaft to members rotating at lower and lower speeds.

Whilst the hub counters hitherto employed are or were complete apparatus in which the whole of the mechanism is distinct from the wheel journal and its nut, the latter being used solely to hold the main shaft or the first operating part against motion, in the counter according to the invention, the first gear element of the counter mechanism, which is preferably a worm, is mounted on the end of the journal.

The said worm, which remains stationary, is in positive engagement with a worm-wheel mounted on the wheel cap and rotatable about the said worm, and these two operating parts form the essential feature of the invention, that is, the first two demultiplying gears of the counter mechanism.

It is found advantageous in practice to employ at once a considerable speed ratio between these two parts, such as 1:20, this being obtained without difficulty by the use of the worm gearing, and such gearing may have a large modulus and a substantial construction, as it does not extend beyond the end of the journal.

The accompanying diagrammatic drawing shows by way of example an embodiment of the invention.

Fig. 1 is an elevational view of the apparatus, with a part shown in section along a plane perpendicular to the axis.

Fig. 2 is a vertical axial section of Fig. 1.

In the interior of the wheel cap 1 are bearings 2a—2b and a recess 3, adapted to receive the shaft 4 and its worm-wheel 5 which is in constant engagement with a worm 6, cut in the metal and at the exterior of the nut 7 threaded on the extremity 11 of the axle journal. The cap of the hub is provided with a recess 8 housing a plurality of counting wheels 9 which are operatively connected to worm-wheel 5, said wheels forming a mileage or revolution counter, there being an opening through the cap for viewing the latter.

The use of the journal nut to provide gearing for the positive control of the counter, offers various essential advantages in the operation of this apparatus.

The modulus of the thread of the nut and worm-wheel has a relatively considerable value, and the gearing is thus very substantial. As the journal is always mounted in this part of the vehicle in ball bearings of great size, the journal and nut rotate with great precision, thereby assuring the proper operation of the worm gearing employed.

The device as a whole does not increase the general size of the normal wheel cap.

Due to the long bearing portion and to the position of the axle of the worm wheel, the several operating parts of the counter device are protected against all introduction of the grease contained in the wheel cap, and such operating parts might on the other hand be mounted in a special box in order to increase the leakless conditions.

Obviously, the details of construction may be varied as desired, without departing from the spirit of the invention, and for instance, the worm need not be cut directly in the metal of the journal nut, but may be separately secured to the front face or to the periphery of the said nut. The worm may also be replaced by any suitable operating part adapted to the same general characteristic, that is, that the axle journal shall be fitted with the first operating part of the gearing of the counter mechanism, which is preferably cut upon the nut of the journal, with the use of a cooperating part consisting of a gear wheel mounted on the cap of the wheel.

I claim

1. In combination with a wheel journal, a nut mounted on the end of the journal and provided with external threads, a hub cap formed with aligned recesses, a counter in one of the recesses, a worm wheel in the other recess meshing with the external threads on said nut, and a shaft connecting the counter and the worm wheel.

2. An operating device for mileage counters including in combination with a journal, a nut fixed to the extremity of the journal and provided with external threads, a hub cap for enclosing the end of the journal formed with a transverse bore enlarged at spaced intervals to form recesses, a counter located in the outer recess, a worm wheel located in the inner recess and meshing with the threads of said nut, and a drive shaft in the bore connecting the counter with the worm wheel.

3. In a mileage counter assembly including a hub cap having a thickened portion extending transversely of the cap, a pair of spaced recesses formed in the thickened portion of the hub cap, a pair of bearings formed at each side of one of the recesses, a rotation counter in one of the recesses, a worm wheel in the other recess, and a shaft mounted in the bearings, said shaft operably connecting the worm wheel to the counter.

EDOUARD SEIGNOL.